United States Patent [19]
Mladjan et al.

[11] Patent Number: 5,600,139
[45] Date of Patent: Feb. 4, 1997

[54] BATTERY-OPERATED THERMAL IMAGING DEVICE WITH SAFETY BATTERY COMPARTMENT

[75] Inventors: Gary Mladjan, Torrance; Anthony Cacioppo, La Palma; Victor Amelino, Redondo Beach, all of Calif.

[73] Assignee: Hughes Electronics, Los Angeles, Calif.

[21] Appl. No.: 540,737

[22] Filed: Oct. 10, 1995

[51] Int. Cl.$^6$ .................................................. G01J 5/04
[52] U.S. Cl. ................................. 250/330; 220/203.1
[58] Field of Search ..................... 220/203.1, 203.09, 220/203.01; 250/330

[56] References Cited

U.S. PATENT DOCUMENTS 3,812,357  5/1974  Flogaus et al. ..................... 250/332

Primary Examiner—Constantine Hannaher
Attorney, Agent, or Firm—Michael W. Sales; Wanda K. Denson-Low

[57] ABSTRACT

A thermal imaging device (10) includes a housing (130) defining a battery compartment, and carrying a door portion (166) closable over this battery compartment to provide environmental protection. The battery compartment door (166) includes a spring-loaded latching device (170) which will maintain the door (166) sealingly closed under normal use conditions of the device (10). However, in the event that a battery (124) received in the compartment should vent gasses sufficient to pressurize the compartment to a selected level, the latching device (170) will yield to allow a slight opening of the door (166) and a controlled venting of these gasses to ambient. Controlled venting of the battery gasses additionally occurs at a location of the device (10) remote from the user, and the battery compartment door (166) is itself interposed between the user and the venting battery (124).

9 Claims, 4 Drawing Sheets

BATTERY-OPERATED THERMAL IMAGING DEVICE WITH SAFETY BATTERY COMPARTMENT

This invention was made with support from the United States Government under contract number DAAB07-91-C-K254 awarded by the Department of the Army. The U.S. Government has certain rights in this invention.

BACKGROUND OF THE INVENTION

1. Field of the Invention

The present invention is in the field of imaging devices. More particularly, the present invention relates to devices for receiving invisible infrared light from a scene, and for providing a visible-light image replicating the scene.

2. Related Technology

Night vision devices have been available for many years. One category of these conventional night vision devices uses image intensifier technology. This technology is effected using a device generally known as an image intensifier tube. The image intensifier tube is essentially a frequency-shifting and amplifying device receiving ambient light, which light may include visible light too dim to provide natural vision (i.e., so-called "Star Light" scopes), or invisible near-infrared light, in a first frequency band and responsively providing a greatly intensified visible image in a phosphorescent monochrome yellow-green light.

Such an image intensifier night vision device converts available low-intensity ambient light to a visible image which a human user of the device may use for surveillance or weapon aiming, for example, under lighting conditions of too dim to allow a scene to be viewed with the natural vision. These image intensifier night vision devices require some residual light, such as moon or star light, in which to operate. This light is generally rich in near-infrared radiation, which is invisible to the human eye. The present generation of night vision scopes use a photoelectrically responsive "window", referred to as a photocathode, which is responsive to the dim or invisible ambient light focused on this "window" from an invisible scene to provide a pattern of photo-electrons flowing as a space charge moving under the influence of an applied electrostatic field, and replicating the scene being viewed. This pattern of photo-electrons is provided to a microchannel plate, which amplifies the electron pattern to a much higher level. To accomplish this amplification at the microchannel plate, the pattern of photo-electrons is introduced into a multitude of small channels (or microchannels) which open onto the opposite surfaces of the plate. By the secondary emission of electrons from the interior surfaces of these channels a shower of electrons in a pattern corresponding to the low-level image is produced. The shower of electrons, at an intensity much above that produced by the photocathode, is then directed onto a phosphorescent screen, again by the application of an electrostatic field. The phosphors of the screen produce an image in visible light which replicates the low-level image.

Image intensifier tubes have evolved from the so-called "Generation I" tubes through the more recent "Generation III" tubes, which provide greater amplification of available light and greater sensitivity to infrared light somewhat deeper into the infrared portion of the spectrum. However, these image intensifier devices are limited with respect to the depth into the infrared portion of the spectrum to which they can operate.

Another category of conventional night vision device is represented by the cryogenically cooled focal plane array thermal imaging devices. These devices use a photoelectrically responsive detector which is cooled to a temperature in the cryogenic range to reduce unwanted thermal noise. The detector includes a plurality of detector elements, or "pixels", each of which provides an electrical signal indicative of the flux of infrared light falling on the detector element. Some such devices use a staring focal plane array; while others have a linear focal plane array of detector elements, and require the use of a scanner to sequentially move portions of the viewed scene across the detector. In either case, because the detector is cooled to cryogenic temperatures, it can proved an electrical response to invisible infrared light much deeper into the infrared part of the spectrum than is possible with the image intensifier devices. The electrical signal provided by such a detector must be processed and converted to a visible image. For this purpose, many such devices of this category have used cathode ray tubes, liquid crystal displays, and other such display technologies to provide a visible image to the user of the device.

A significant disadvantage of this category of night vision device is the requirement for cryogenic cooling of the detector. Early devices of this category used a Dewar vessel into which a supply of a cryogenic fluid (such a liquid nitrogen) had to be provided by the user of the device. The utility of such devices was severely limited by their requirement for occasional replenishment of the cryogenic coolant. Later devices of this type have used cryogenic cooling developed by reverse Sterling-cycle coolers. However, such coolers require a considerable amount of power, are not without their own maintenance and reliability problems, and are generally noisy.

Conventional portable devices of these types are known which employ a lithium battery for power. Lithium batteries have been known to violently vent for a number of reasons. Conventionally, such devices simply include a compartment, which may be sealed closed for environmental protection. In the event of a battery venting, the sealed compartment may be blown open with catastrophic consequences. In some cases, the gasses vented from the battery are vented from the compartment forcefully, uncontrollably, and even occasionally in the direction of personnel operating the device. In these cases, personnel may be injured by debris resulting from the blowing open of the battery compartment. A conventional expedient has been to provide a battery compartment sufficiently strong as to contain the venting gasses from a lithium battery. However, with portable devices such a strong battery compartment structure adds prohibitively to the weight, bulk, and expense of the device.

SUMMARY OF THE INVENTION

In view of the deficiencies of the conventional technology, a primary object for this invention is to overcome one or more of these deficiencies.

Another objective for this invention is to provide a light-weight, portable thermal imaging device with a battery compartment providing environmental protection for the battery while still providing safe venting of gasses from the battery.

Accordingly, the present invention provides a portable battery-operated thermal imaging device for receiving thermal infrared radiation from a scene and providing a visible image replicating the scene, the thermal imaging device including a housing defining a recess for receiving a battery; a door closing sealingly across the recess to bound a battery compartment in the recess; and a latching device engaging the housing and the door for securing the door sealingly closed across the recess, the latching device including a resilient portion yielding elastically in response to a selected force level created by gas pressure within the battery compartment acting on the door, thereby to allow limited unsealing movement of the door away from the housing and the escape of gas pressure from within the battery compartment.

These and additional objects and advantages of the present invention will be appreciated from a reading of the following detailed description of at least one preferred exemplary embodiment of the invention, taken in conjunction with the appended drawing Figures, in which the same reference numeral indicates the same feature, or features which are analogous in structure or function to one another.

DESCRIPTION OF THE DRAWING FIGURES

FIG. 1 provides a diagrammatic representation of the functionally cooperating physical components of a thermal imaging device embodying the invention;

FIG. 2 is a schematic block diagram of a thermal imaging device according to the present invention;

FIGS. 3a and 3b respectively provide an external view and an exploded perspective view of a thermal imaging device embodying the invention; and FIGS. 4a and 4a provide respective fragmentary side elevation views, partially in cross section, of the thermal imaging device seen in FIGS. 3a and 3b, and with parts thereof in alternative operative positions.

DETAILED DESCRIPTION OF AN EXEMPLARY PREFERRED EMBODIMENT OF THE INVENTION

An overview

Figure 1:
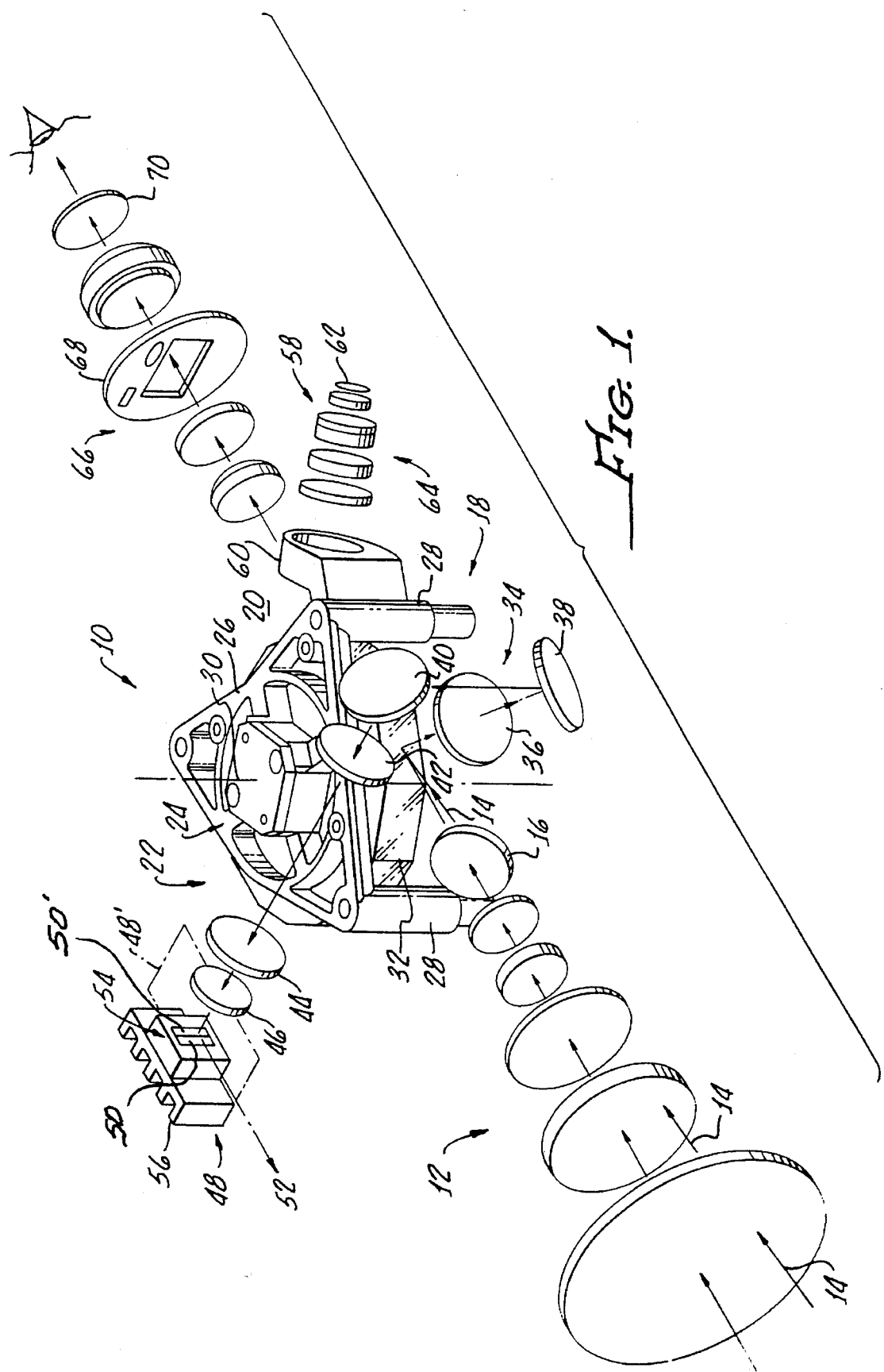

Viewing FIG.1, a thermal imaging device 10 is diagrammatically depicted with its functionally cooperative physical components suspended in space without the depiction of a supporting housing (which housing is, of course, included by a physical embodiment of the device), so that these components and a ray-tracing diagram for light rays in the device can also be presented. Viewing FIG. 1 in detail, the thermal imaging device includes an objective optics group, generally indicated with the numeral 12. This objective optics group includes several lenses (multiple as shown), which lenses are transparent to light in the spectral band of interest (but not necessarily transparent to visible light). The objective optics group 12 is pointed toward a scene to be viewed, so that infrared light from this scene (indicated with the arrowed numeral 14) can be received and focused by this optics group. It will be understood that the objective optics group 12 seen in FIG. 1 is representative only, and that this optics group may be removed and replaced with objective optics of differing configurations, as will be further described. The objective optics group 12 concentrates and columnates received light through a window 16, which window is a permanent part of a basic sensor portion 18 of the device 10. In conjunction with the housing (to be described below) of this basic sensor portion 18, this window 16 bounds a sealed chamber 20 in which are received almost all of the remaining components of the device 10 as illustrated in FIG. 1.

Within the housing chamber 20 is received a scanner, generally referenced with the numeral 22. This scanner 22 includes a scanner frame 24, which is generally of triangular or tripod configuration in plan view. The scanner frame 24 includes a generally triangular upper wall portion 26, and three depending leg portions 28, only two of which are visible in FIG. 1. Carried by the wall portion 26 is a scanner motor, generally indicated with the numeral 30. This scanner motor 30 includes a generally vertically extending rotational drive shaft (not visible in the drawing Figures) drivingly carrying a disk-like circular multi-faceted scanning mirror 32. The scanning mirror 32 includes plural outwardly and circumferentially disposed adjacent facets (multiple as shown), only a few facets of which are seen in any one of the drawing Figures. This scanning mirror 32 rotates in a generally horizontal plane to reflect light 14 received via the window 16 and objective optics group 12 to an image optics group, generally indicated with the numeral 34. It will be noted that because of rotation of the scanning mirror 32, the facets multiple as shown, continually change their angulation in the horizontal plane with respect to the scene viewed via the objective optics group 12.

Considering the image optics group 34 in greater detail, it is seen that light (arrow 14) reflected from a facet of the scanning mirror 32 passes through a lens 36 and to a pair of vertically spaced angulated mirrors 38, and 40. The mirror 40 reflects this light through an additional pair of lenses 42, and 44 toward a window 46 carried by a Dewar vessel 48. The Dewar vessel 48 includes a thermally insulative housing, generally indicated with the dashed line and the reference numeral 48'. This Dewar vessel 48 houses a linear focal plane infrared detector 50 having a linearly arrayed multitude of small infrared detector elements, indicated collectively on FIG. 1 with the vertical line 50' on detector 50. Each of the detector elements 50' of the detector 50 provides a corresponding one of a like multitude of electrical signals each of which is indicative of the flux level of infrared light falling on the particular detector element. These electrical signals are provided outwardly of the Dewar vessel 48 by an electrical interface (to be further described), and indicated on FIG. 1 with the dashed line 52.

In order to cool the detector 50 to a sufficiently low temperature that thermally excited electrons (as opposed to electrons excited by photons of infrared light falling on the detector 50) do not cause an undesirably high level of electrical noise which would hide the desired photoelectric image signal, the Dewar vessel 48 includes a multi-stage reversed Peltier-effect (i.e., thermoelectric) cooler 54. The thermoelectric cooler 54 has a chilling face to which the detector 50 is mounted to be cooled, and a heating face in heat transfer relationship with a heat sink schematically indicated with the numeral 56. In the physical embodiment of the imaging device 10, the heat sink 56 is defined by a metallic portion of the housing for the device 10 as will be seen. It will be understood that because of the continuous change in angulation of each facet (multiple as shown), of the scanning mirror 32 as this mirror rotates in a horizontal plane, the scene reflected from each particular facet sweeps horizontally across the linear array of detector elements 50' (i.e., perpendicularly to the vertical linear array of these detector elements). The detector elements 50' responsively provide electrical signals (via interface 52) which are indicative of the flux levels of infrared light falling on corresponding ones of the plural detector elements 50' from a particular part of the scene during any one sweep of a scene portion across the detector 50.

In order to provide a visible image to be viewed by a user of the imaging device 10, a light emitting diode (LED) projection array module 58 is carried by an apertured flange portion 60 of the scanner frame 26. This LED projection array module 58 includes a linear LED array 62, which array includes a multitude of individual LED's not visible in FIG. 1), each individually emitting visible light when energized. The LED's of the array 62 are arrayed linearly along a vertical line similarly to the linear arrangement of the detector elements 50' of the detector 50. The LED's of array 62 provide respective portions of a visible image, as will become apparent. Light from the LED's of array 62 is columnated and projected by a projection lens group, generally indicated with the numeral 64, onto a facet of the mirror 32'. The numeral 14 is are used intentionally with respect to the invisible infrared light carrying image information from a scene, and the visible light replicating the scene for viewing by a user of the device 10.

From the mirror 32 the visible light from the LED's of array 62 is reflected to an ocular lens group, generally indicated with the numeral 66. The ocular lens group 66 includes several individual lenses Along with the lenses of ocular lens group 66, a status display unit 68 is interposed in defines an aperture through which the visible image is perceived, and includes several individual LED's which when illuminating are peripherally visible to the user of the device 10. These individual LED's are not shown Finally, the imaging device 10 includes a pair of eyepiece shutters 70. These shutters 70 are biased closed to prevent light emanations from the device 10 when a user's face is not pressed against a movable eyepiece member (to be described below). When the user presses against the movable eyepiece member, the shutters 70 open to allow the user to view the visible light image provided by the LED projection display module and the spinning mirror 32.

Figure 2:
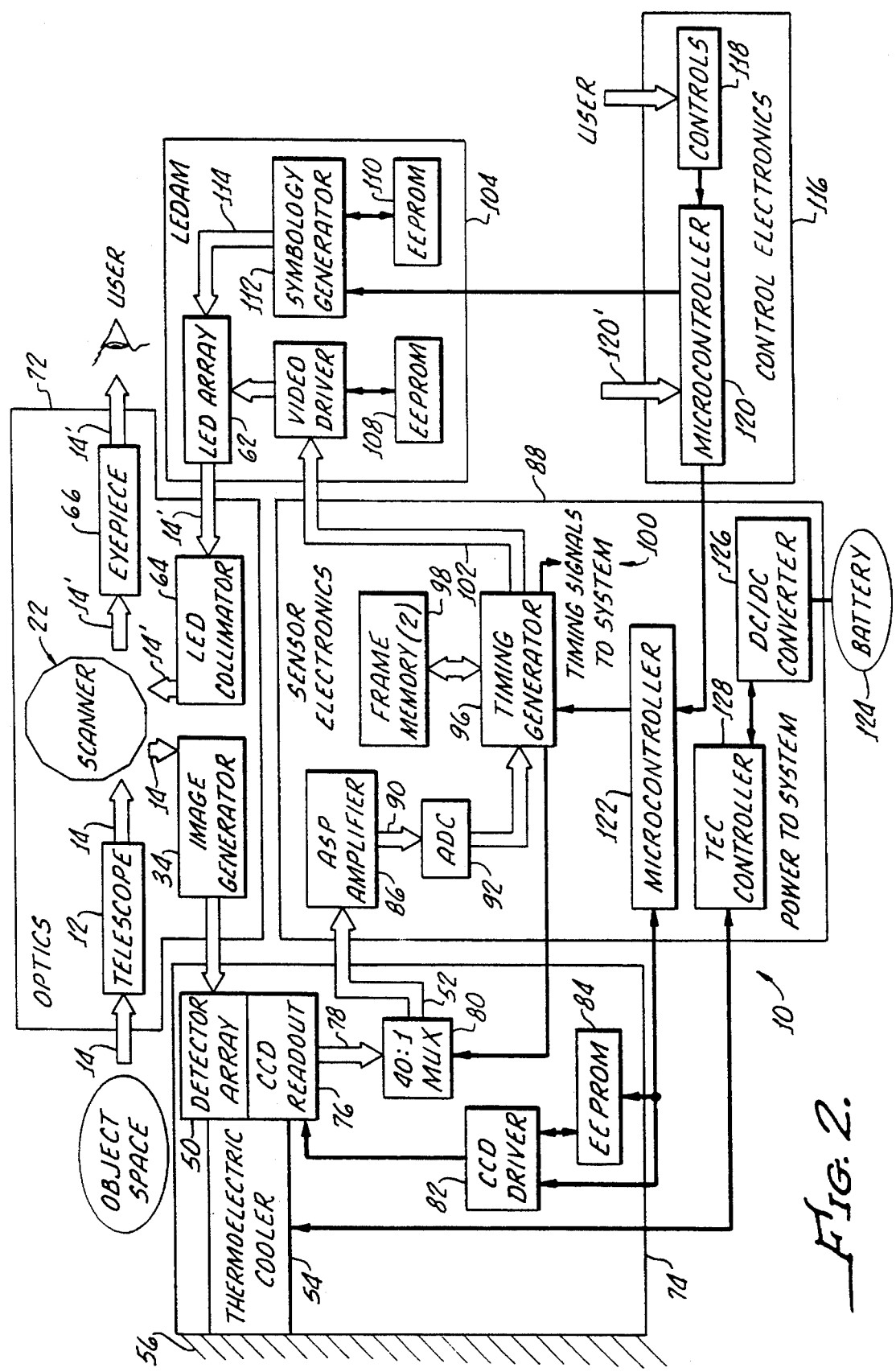

Viewing now FIG. 2, a schematic functional block diagram of the thermal imaging device 10 is presented. This thermal image device 10 is divided into functionally modular portions, as is indicated by the dashed-line boxes encircling the various components of the device, with some of the modules including several sub-modules or components. The module 72 manages both invisible and visible light, and includes the objective optics group 12 receiving the invisible infrared light 14 from a scene to be viewed, the scanner 22, and image optics group 34 directing this invisible light to the detector 50. This light management module 72 also receives visible light from the LED array 62, and includes the projection lens group 64 projecting this light to the scanner 22, and ocular lens group 66 providing the image to a user of the device.

Detection module 74 is enclosed within the Dewar vessel 48, and receives the focused invisible infrared light 14 from the scene to be viewed. This module 74 includes the detector 50, along with a readout circuit 76 providing multiple channels of electrical image signal 78 (one channel for each detector element of the linear detector array 50, recalling the description above) to a multiplexer circuit (MUX) 80. The MUX 80 provides the electrical interface output 52 in the form of a serial analog image signal. Detector module 74 also includes a driver circuit 82 providing control commands to the readout circuit 76. An electrically erasable programmable read-only memory (EEPROM) 84 is included in the detection module 74 to locally store and provide data on the operation of the readout circuit 76, providing compensation factors locally for a number of gain-control and non-uniformity compensations in connection with the infrared detector 50. As can be seen from FIG. 2, the various circuits of the module 74 have electrical interface with other modules of the device 10.

The serial analog image signals 52 provided by module 74 are received by an analog signal processor (ASP) 86 which is located in a process-and-control (P&C) module 88. A processed serial analog image signal 90 is provided by the ASP 86 to a analog-to-digital converter (ADC) 92. A resulting processed serial digital image signal 94 is provided to a timing generator 96. This timing generator 96 has an interface with the multiplexer circuit 80 to control the timing of operation of this circuit. A frame memory 98 is interfaced with the timing generator so that image information which is global to the scene being viewed may be stored and retrieved for use in providing gain adjustment, contrast, and other compensation factors for use in processing the image signals obtained from the detection module 74. Timing generator 96 also provides a system-wide timing control signal, indicated with the reference numeral 100. This timing control signal is used to operate several other features of the imaging device 10, including control of the rotational speed and position of the mirror 32 so as to achieve time-correlation of the operation of the detector 50, mirror 32, and LED array 62.

A serial digital image signal 102, compensated and time-correlated, is provided by the timing generator 96 to a display module 104. This display module 104 includes the LED projection array module 58, along with a driver circuit 106 for receiving the signal 102 and driving the individual LED's of array 62 in response to this signal. An electrically erasable programmable read-only memory (EEPROM) 108 has an interface with the driver circuit 106 for receiving and storing for future use values to be used in the operation of the device 10. For example, EPROM 108 may be used to store stadia line spacing information, which would allow the device 10 to be used to estimate ranges to personnel or vehicles of known sizes. In order to provide a user of the imaging device 10 with additional useful image information, such as spaced-apart comparative-size lines for humans and various types of vehicles so that ranges can be estimated, or with a reticle of various kinds and sizes in accord with the range to an object being viewed and the use being made of the device 10 at a particular time, the display module 102 also includes another electrically erasable programmable read-only memory (EEPROM) 110 for storing such image information. This image information, as selected by the user of the device 10, is provided to a symbology generator circuit 112, which in turn provides a symbology signal 114 to the LED array 62. The array 62 includes separate light emitting diodes (LED's) for receiving the signal 114.

In order to complete this description of the imaging device 10 as illustrated in FIG. 2, it should be noted that the device 10 includes an input-output (I/O) module 116. This I/O module 116 allows a user of the device 10 to input commands via a set of externally-accessible controls 118, such as a set of momentary contact push button switches which may be operated from outside the housing of the device 10. The controls 118 have an interface with a microprocessor 120, which is part of a distributed control system also including another microprocessor 122 in the P&C module 88. The microprocessors 120 and 122 have an interface with the EEPROMs 84, 108 and 110, along with the circuits served by the data and commands stored in these EEPROMs. The microprocessor 120 has an externally-accessible data interface port 120' so that all of the data and programming stored in the microprocessors 120, 122, and the AA's interfaced with these EEPROMs, and the circuits served, may be inserted and changed by access to the port 120'. Finally, it is seen that the P&C module 88 provides power input to the system from a power source, such as from a battery pack 124. A DC/DC power converter 126 provides power to various modules and components of the device 10 at appropriate voltage and current levels. One of the circuits powered from converter 126 is a controller 128 for the thermoelectric cooler 54.

Figure 3A:
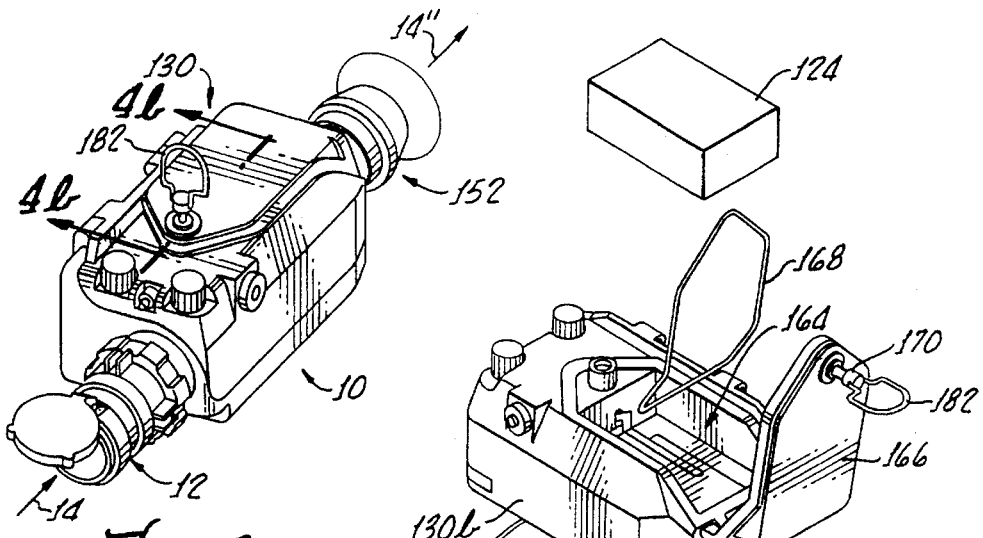
Figure 3B:
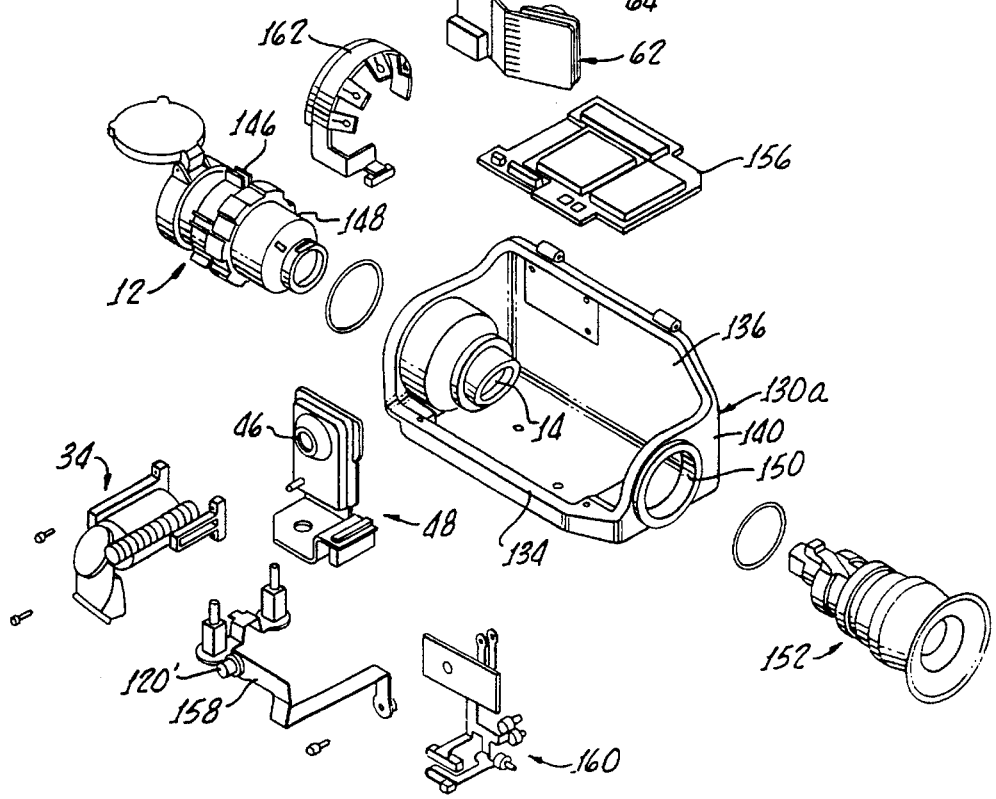

Turning now to FIGS. 3a and 3b, a physical embodiment of the imaging device 10 is presented in external view and in exploded perspective view, respectively. The imaging device 10 includes a two-piece chambered housing 130. This housing includes two pieces 130a and 130b which sealingly cooperate (via an intervening sealing member 132) to bound the chamber 20 within this housing. The part 130a of the housing 130 is fabricated of cast non-magnetic metal (of aluminum, for example), is somewhat L-shaped in transverse cross section, and provides a lower wall portion 134, a side wall portion 136, and an apertured pair of opposite front (138), and rear (140) wall portions. This housing part 130a provides a heat sink for the thermoelectric cooler 54, and a base (i.e., in effect, an optical bench) to which the optical and other components of the device 10 are mounted, as will be seen.

The front wall portion 138 of housing part 130a defines a reentrant portion 142 which forwardly defines a somewhat conical recess (not visible in the drawing Figures), and which at its aft end carries the window 16 in the aperture 144 of this wall. The objective optics group 12 is carried at this front wall 138 by a housing 146 which at its aft end defines a conical portion 148 for receipt into the front recess of the housing part 130a. The housing 146 is removably engageable with the housing part 130 to connect the objective optics group 12 in its proper location, and is also removable so that optics of different power may be fitted to the sensor portion 18. At the aperture 150 of the rear wall portion 140, the ocular lens group 66 is sealingly carried in a housing portion 152.

Within the chamber 20 of the housing 130, the scanner 24 is secured to the lower wall 134 by a trio of screws 154 which each pass through a respective vertically extending hole defined centrally of a corresponding one of the three legs 28 of the scanner frame 24. These screws threadably engage respective bores defined by the lower wall 134. Captured between the lower ends of the legs of the scanner frame 24 and the lower wall 134 of the housing 130 is an electronics assembly 156. This electronics assembly 156 includes a circuit board and many of the discrete and integrated circuit devices including micro-controller 122, which are necessary in order to effect the functions explained with respect to FIGS. 1 and 2. Also mounted to the lower housing part 130a, in addition to the already identified components and modules, which are indicated on FIG. 3b with their previously-introduced reference numerals, is an electronic cable assembly 158. This cable carries externally-accessible data interface port 120', the connector for which extends sealingly through a hole provided in the housing portion 130b, as is seen in this drawing Figure.

A Control electronics module 160 with its own cable assembly also mounts in the housing 130 and provides the control input momentary-contact switches 118 and micro-controller 120 identified with respect to FIG. 2. Finally, received in the housing 130 and circumscribing the reentrant portion 142 of the front wall 138 is a magnetic reed switch and cable assembly 162. This cable assembly with its several magnetically-responsive reed switches is responsive to one or more magnets carried in respective locations by various ones of the objective optics groups which can be used with the basic sensor 18. These magnets are located in particular locations (i.e., in a position code) on each objective lens set in order to provide a user both with differing levels of magnification of a distant scene, and differing symbology appropriate for the particular use for which the objective lens set adapts the sensor 18. When the basic sensor responds to the installation of a particular lens group, the user is provided with symbology and other internal adjustments of the operation of the sensor 18 automatically. The reed switches are able to sense the particular locations of the magnets on the lens groups (thus identifying the particular lens group) through the non-magnetic front wall portion 138 of the housing 130. Thus, no physical input is necessary from an operator to identify a particular lens group to the sensor 18, and the chamber 20 remains sealed.

Viewing now the housing portion 130b, it is seen that this housing portion defines a battery compartment recess 164 at an aft portion of the housing 130. This recess opens both upwardly and rearwardly on the housing part 130b. Battery 124 is received into the recess 164, and is covered sealingly in this recess by a hinged door member 166 with an intervening sealing member 168. The door 166 is somewhat L-shaped in side view, and is hinged adjacent to its rear edge to the housing part 130b near the rear edge of the latter. A latching device 170 is carried by the door 166 adjacent to its forward end, and is removably engageable with a recess feature of this housing part to retain the door 166 in its closed position, as is seen in FIG. 3a.

Figure 4A:
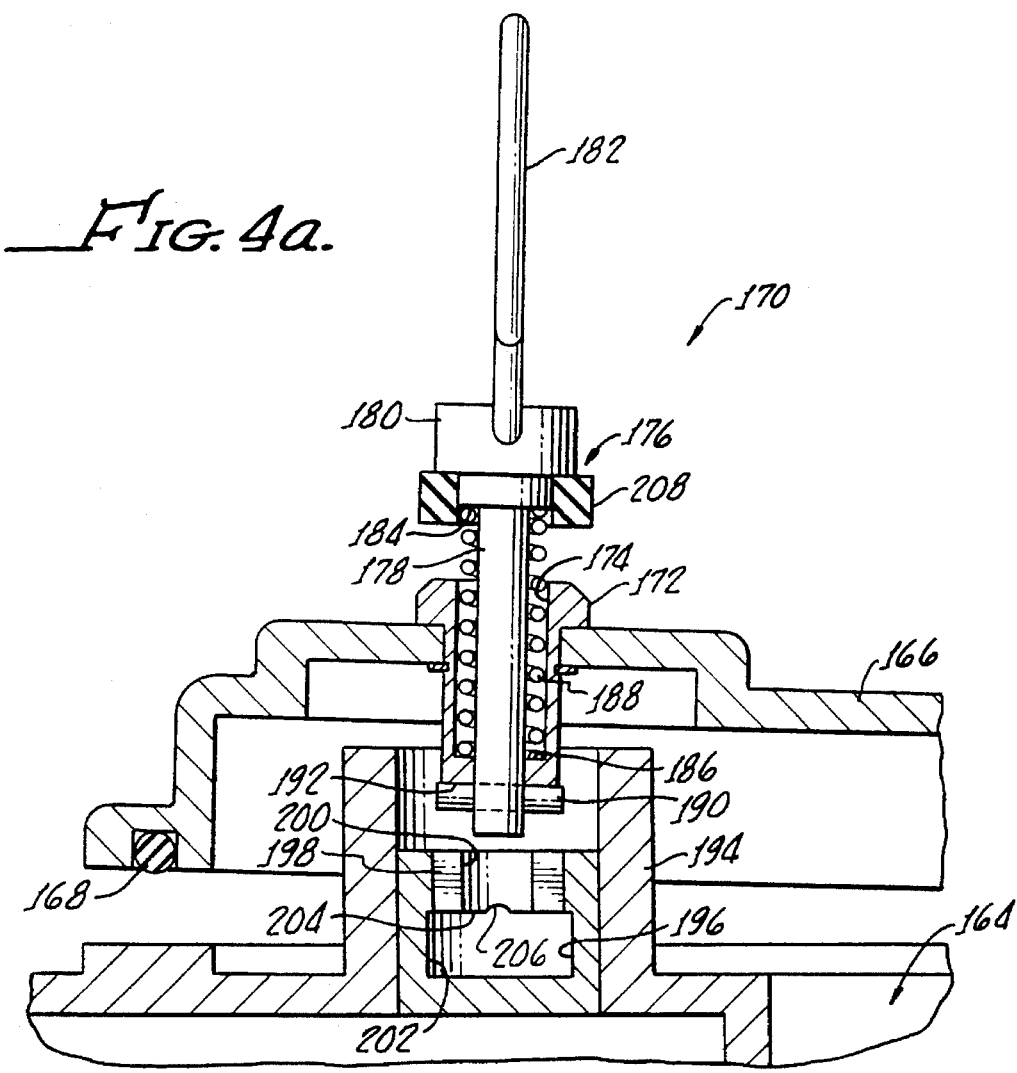

Viewing FIG. 4a, it is seen that the door 166 carries a boss 172 having a central stepped through bore 174. Captively received in this stepped through bore 174 is a latching member 176. The latching member includes a stepped and headed stem 178, which at its upper headed portion 180 pivotally carries a manually-operable ring portion 182. The head portion 180 cooperates with the remainder of stem 178 to define a shoulder 184. Trapped between the shoulder 184 of the head portion 180 and a step 186 on the stepped bore 174 is a coil compression spring 188. This coil spring 188 biases the stem 178 outwardly of the bore 174 so that a cross pin 190 carried by the stem 178 engages an end surface 192 of the boss 172.

Viewing the housing portion 130b, it is seen that at the forward end of the battery compartment recess 164, this housing portion includes a boss 194 defining a stepped blind bore 196. The bore 196 aligns with and receives the stem 178 of the latching member 176 when the door 166 is moved to its closed position. The boss 194 defines a pair of opposite grooves 198 extending axially along a smaller-diameter portion 200 the bore 196. These grooves 198 allow each of the opposite end portions of the cross pin 190 to be aligned with a respective groove 198 and to pass into and through the smaller diameter portion 200 of the bore 196 into a larger-diameter portion 202 of the bore 196.

Figure 4B:
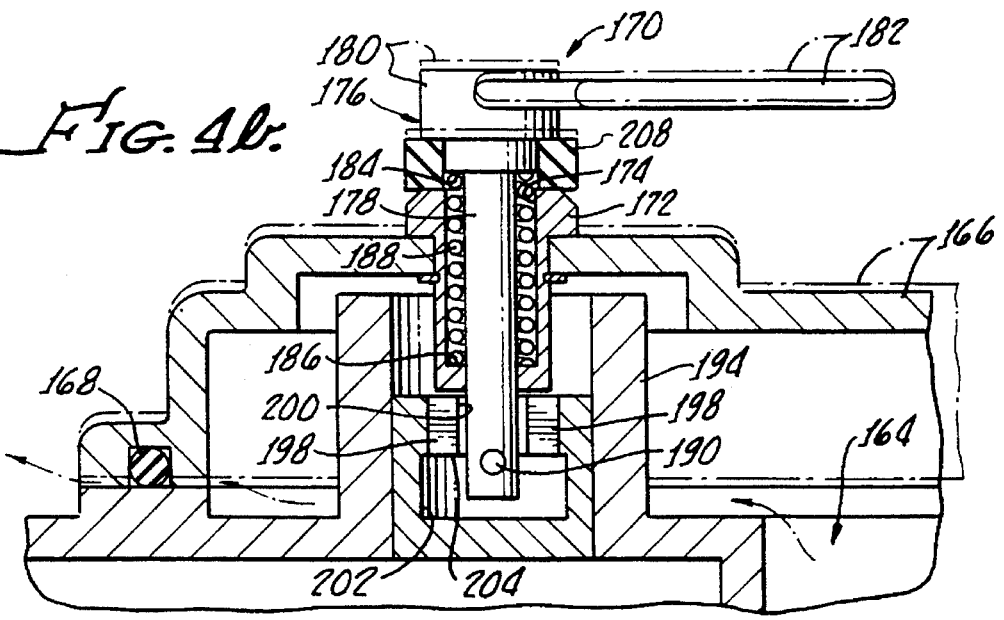

In order to so insert the stem 178 into the bore 196, the user of the device 10 must relatively rotate the stem by manually grasping the ring portion 182 and applying an axial force along the stem 178 to compress the spring 188, thus biasing the door 166 to a closed position seen in solid lines in FIG. 4b. The bore portions 200 and 202 cooperate to define a shoulder 204 against which the opposite end portions of the cross pin 190 are engageable by rotation of the stem 178. Preferably, this shoulder (which is interrupted by the grooves 198) also defines a pair of opposite recesses 206 (only one of which is visible in FIG. 4a) receiving the cross pin 190 for detenting the stem 178 in this latched position. In this way, a user of the device 10 may latch the battery compartment door 166 closed, establishing a pre-load in the spring 188. The seal 168 insures that environmental protection is provided for the battery 124, recalling FIG. 2, and for the interior of the housing 130, in the latched closed position of the door 166. A resilient seal collar 208 carried on the stem 178 provides resilient sealing for the compartment 164 at this location. The ring portion 182 may be manually pivoted to a position laying against or closely adjacent to the outer surface of door 166.

However, in the event that the battery 124 should vent gasses sufficient in volume to pressurize the compartment 164 to a selected pressure level above ambient, then this pressure acting on the area of the inside surface of the door 166 will overcome the pre-load of spring 188. Consequently, the door 166 will be forced slightly outwardly sufficiently to unseat seal member 168 from its sealing engagement with the housing portion 130b, as is seen in phantom lines in FIG. 4b. This pressure-relieving unseating of the seal member 168 will be only to the extent of creating an opening a small fraction of an inch (2.54 cm) in size. The seal collar 208 is sufficiently resilient as to yield and allow the door 166 to open slightly, as depicted in FIG. 4a. However, this opening will be sufficient to effect controlled venting of pressurized gasses from the compartment 164, and to prevent pressure sufficient to blow the door 166 open from being developed in this compartment. Further, because the door 166 is hinged at its rear edge, this hinge and the door itself serve to protect the user of the device 10 from venting gasses. Because the door 166 is hinged at its rear edge, the greatest opening for the controlled venting of gasses will tend to occur at the forward end of the door. Consequently, gasses vented from the compartment are vented in a controlled manner, at a pressure selected in view of the structural strength of the housing 130, and at a location remote from the user of the device 10. Additionally, in the rare event that the venting of gasses from a battery is so rapid and so voluminous that the controlled venting of compartment 164 described above is not sufficient to contain and control this venting, the strength of the boss 194, and/or cross pin 190 may be selected so that the door 166 will be blown open rather than allowing some other part of the housing 130 to fail explosively. Even in this event, the user of the device 10 is protected because the door 166 will be retained on its hinge and is interposed between the user and the battery 124.

While the present invention has been depicted, described, and is defined by reference to a particularly preferred embodiment of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiment of the invention is exemplary only, and is not exhaustive of the scope of the invention. Consequently, the invention is intended to be limited only by the spirit and scope of the appended claims, giving full cognizance to equivalents in all respects.

What is claimed is:

1. A portable battery-operated thermal imaging device for receiving thermal infrared radiation from a scene and providing a visible image replicating the scene, said thermal imaging device comprising:

a housing defining a recess for receiving a battery;

a door hingably attached to said housing and closing sealingly across said recess to bound a battery compartment in said recess; and a latching device engaging said housing and said door for securing said door sealingly closed across said recess, said latching device including a resilient portion yielding elastically in response to a selected force level created by gas pressure within said battery compartment acting on said door, thereby to allow limited unsealing movement of said door away from said housing and the escape of gas pressure from within said battery compartment.

2. The portable battery-operated thermal imaging device of claim 1 wherein said thermal imaging device includes an objective lens for receiving thermal infrared radiation from the scene, said objective lens being carried at one side of said housing, and an ocular lens carried at an opposite side of said housing for presenting the visible image replicating the scene to the user, said door being hinged to said housing adjacent said opposite side of said housing.

3. The portable battery-operated thermal imaging device of claim 2 wherein said housing is elongate in a direction extending between said objective lens and said ocular lens, said one side of said housing being a forward end and said opposite side of said housing being a rearward end of said imaging device, said door being hinged to said housing adjacent said rearward end of said device and adjacent to a rearward end of said door, and said door in an open position thereof interposing between said battery recess and a user of said device.

4. The portable battery-operated thermal imaging device of claim 3 wherein said door carries said latching device adjacent to a forward end of said door.

5. The portable battery-operated thermal imaging device of claim 1 wherein said latching device includes a stem member carried by one of said housing and said door, said stem member including a portion selectively and removably engaging the other of said housing and said door, and said stem member carrying a resilient element urging said one of said housing and said door toward sealing engagement with said other of said housing and said door.

6. The portable battery-operated thermal imaging device of claim 5 wherein said door at one edge thereof is hingably attached to said housing, and said door carries a boss spaced from said hangable attachment of said door to said housing, said boss defining a through bore, and said latching device further including a stem member carried in said through bore of said boss, said housing defining a blind bore receiving said stem member in a closed position of said door, and said stem member including a cross pin selectively engaging a shoulder defined on said blind bore of said housing to retain said door in said closed position, said resilient element urging said door toward sealing engagement with said housing including said stem carrying a coil spring engaging both a shoulder on said stem member and said door to urge said door yieldably and sealingly toward said housing.

7. The portable battery-operated thermal imaging device of claim 6 wherein said coil spring yields in response to a selected force level created by gas pressure within said battery compartment acting on said door, thereby to allow said door to move slightly away from and to unseal from said housing to allow escape of gas pressure from within said battery compartment.

8. A portable battery-operated thermal imaging device for receiving thermal infrared radiation from a scene and providing a visible image replicating the scene, said thermal imaging device comprising:

an elongate housing at a forward end carrying an objective lens and at a rearward end thereof carrying an ocular lens, said housing defining an upwardly and rearwardly opening recess for receiving a battery;

a door at a rear edge thereof hingably attached to said housing adjacent to said rearward end thereof, said door in a first position thereof sealingly closing forwardly across said recess to bound a battery compartment in said recess, said door opening upwardly and rearwardly to a second position thereof allowing insertion into and removal of said battery from said recess; and a latching device carried adjacent to a forward end of said door and removably engaging said housing for securing said door sealingly closed across said recess in said first position, said latching device disengaging manually from said housing to allow manual hinging of said door to said second position thereof, said latching device further including a resilient portion yielding elastically in response to a selected force level created by gas pressure within said battery compartment acting on said door to allow said door to move to a third position thereof of away from said housing with unsealing from said housing for controlled escape of gas pressure from within said battery compartment.

9. The portable battery-operated thermal imaging device of claim 8 wherein said latching device includes a stem member carried by a through-apertured boss on said door, said stem member including a cross pin member selectively and removably engaging said housing in response to relative rotation of said stem member to engage said cross pin member with a shoulder defined on said housing, and resilient portion including said stem member carrying a coil compression spring urging said door toward sealing engagement with said housing.

* * * * *